United States Patent [19]

Rockwell, III

[11] Patent Number: 5,106,181
[45] Date of Patent: Apr. 21, 1992

[54] OPTICAL WAVEGUIDE DISPLAY SYSTEM

[76] Inventor: Marshall A. Rockwell, III, 303 Grenola St., Pacific Palisades, Calif. 90272

[21] Appl. No.: 337,141

[22] Filed: Apr. 12, 1989

[51] Int. Cl.$^5$ .............................................. G02B 6/04
[52] U.S. Cl. ........................................ 385/2; 40/547; 385/1; 385/33; 385/116
[58] Field of Search ............... 350/96.1, 96.11, 96.12, 350/96.13, 96.14, 96.15, 96.16, 96.19, 96.24, 96.25; 358/901; 40/547; 362/32

[56] References Cited

U.S. PATENT DOCUMENTS

| | | | |
|---|---|---|---|
| 3,535,018 | 10/1970 | Vasilatos | 350/96.24 |
| 3,562,414 | 2/1971 | Blum | 178/5.4 |
| 3,619,796 | 11/1971 | Seidel | 330/4.6 |
| 3,856,378 | 12/1974 | Brandt | 350/96 |
| 3,871,747 | 5/1975 | Andrews | 350/160 |
| 4,086,484 | 4/1978 | Steensma | 358/901 X |
| 4,387,954 | 6/1983 | Beasley | 350/96.15 |
| 4,422,719 | 12/1983 | Orcutt | 350/96.30 |
| 4,576,436 | 3/1986 | Daniel | 350/96.10 |
| 4,578,709 | 3/1986 | Lang et al. | 358/230 |
| 4,591,232 | 5/1986 | Jeskey | 350/96.27 |
| 4,640,592 | 2/1987 | Nishimura | 350/96.32 |
| 4,719,482 | 1/1988 | Hora | 350/91 |
| 4,899,260 | 2/1990 | Schrammek et al. | 362/32 |
| 4,911,527 | 3/1990 | Garciia, Jr. et al. | 350/96.24 |
| 4,929,048 | 5/1990 | Caypers | 350/96.24 |

OTHER PUBLICATIONS

Manhar L. Shah, "Fast Acousto-Optical Waveguide Modulators", Jul. 1973, Applied Physics Letters.
G. B. Brandt, "Bulk Acoustic Wave Interaction with Guided Optical Waves", Jul. 1973, Applied Physics Letters.
B. L. Heffner, "Switchable Fiber-Optic Tap Using the Acousto-Optic Bragg Interaction", Jul. 1986, Optical Soc. of Amer.
C. H. von Helmot, "Sawdic: Surface-Acoustic-Wave-Driven Directional Coupler", May 14, 1981.
M. Zurn, "Elasto-Optic Loss Modulation on Side-Polished Fibre", May 17, 1988.

Primary Examiner—Frank Gonzalez

[57] ABSTRACT

A thin, large, high definition television screen (2) employs optical waveguides (22). Light continually flows through waveguides closely arranged, in parallel (86), across a substrate. Light is prematurely made to exit (32) the waveguide cores by intensity modulators (66) and taps (64) placed along the length of the waveguides. The intensity modulators control the brightness of light in the waveguides. Taps direct intensity-modulated light out of the waveguides to the viewer (68). Systematically modulating the intensity of light and tapping light out of a system of parallel waveguides allows still and moving images to be formed. The preferred embodiment employs acoustic intensity modulators and taps. Sound waves (34) propagate perpendicularly (3) to the direction of light flow (5) causing changes in the index of refraction in the waveguides via the acousto-optic effect. Electro-optic modulators (42) and thin-film (86) waveguides can also be used in place of acousto-optic modulators and discrete fibers. This display can be economically produced using a flexible waveguide ribbon (130) which integrates multiple waveguides (94), intensity modulators (147) and taps (148) into a single unit.

23 Claims, 11 Drawing Sheets

OPTICAL WAVEGUIDE DISPLAY SYSTEM

BACKGROUND OF THE INVENTION

1. Field of the Invention

This invention relates to thin panel television displays. More particularly, this application describes a thin panel display technology based on optical waveguides. Specifically, a technique for tapping light out from the cores of closely spaced parallel optical waveguides is described which enables images to be formed on large viewing screens.

2. The Need for a Flat Panel Display

Since the cathode-ray tube (CRT) television was first commercially introduced in the 1930's, display manufacturers have attempted to make a screen which can be hung on a wall like a painting. This "moving painting" should ideally be flat, bright, large, inexpensive, rugged and with a high enough resolution, at least $1024 \times 1024$ color picture elements or "pixels", to produce a high definition television (HDTV) image. The ability to make a thin picture screen will have a great impact on the television viewing experience. For example, thin panel screens will facilitate in-home entertainment centers. A home viewer will be able to watch theater-quality movies without bulky and expensive projection equipment.

3. Prior Art

Liquid crystal, gas plasma, vacuum fluorescent and electroluminescent technologies are presently considered the most promising for use in thin panel displays. These technologies are similar in that they all rely on a matrix of electrodes. Electrical signals applied to the matrix of electrodes control a working medium. Commonly used working mediums include liquid crystals, neon, and phosphors. The working medium is typically sandwiched between the matrix of electrodes. The light emitted from a screen pixel is regulated by energizing its associated electrodes. If the proper electrical signals are rapidly applied to the electrodes, still and moving images can be formed.

In practice, large displays based on matrices of electrodes have yet to be constructed. Increasing the screen size makes the electrode geometry and composition more difficult to control during the manufacturing process. As a result, large matrix-based electrode panels tend to have irregular screen brightness regions and defective picture elements. While screen brightness irregularities can be compensated for by electronically processing picture signals before they are applied to the display, defective picture elements can render a panel useless. Defective picture elements in very large displays currently make large matrix-electrode panels prohibitively expensive to produce. It is unlikely wall-sized matrix-electrode displays will become economically feasible in the near future.

In an effort to address these problems, a variety of less well-known display designs have been proposed. One particular design approach is based on the use of optical waveguides. Optical waveguides are capable of carrying high-intensity light long distances, with little attenuation. These efficient light carrying properties make waveguides well suited for use in large screen displays.

One prior art waveguide design employs optical fibers to magnify images from an image source. For example, if the image source is a CRT, and a plurality of optical waveguides are butted to the face of the CRT, the individual fibers associated with each pixel on the CRT can carry light to a separate, larger, display panel. Each pixel from the CRT is mapped, one-to-one, onto the large panel by a dedicated fiber. If the panel is much larger than the original CRT, the fibers collectively act to magnify the picture image. Extremely large screens can be built using this fiber optic magnification technique.

When applying fiber optic magnification to HDTV, a number of problems arise. A fiber optic magnification system at a HDTV resolution requires millions of separate optical fibers. Producing a screen with millions of optical fibers is both complicated and expensive. Consequently, fiber optic magnification techniques are generally considered impractical for use in high resolution displays.

An improved optical waveguide technique is based on removing, or tapping out, light from a waveguide core before it reaches the end of the fiber. Instead of using one fiber per pixel, as described above, a single fiber can be made to show many pixels. For example, multiple taps can be placed along the length of a single fiber. If the taps are scanned in rapid succession, a single fiber will appear to possess many separate light emitting elements. Tapping light out, and allowing it to be seen by a viewer, greatly reduces the number of waveguides needed in a display.

A number of investigators have pursued this multiplexed, waveguide/tap, approach. The few resulting waveguide/tap designs are similar in that they have all attempted to find an efficient means of tapping light out from the waveguide core. The light tapping techniques discussed in the prior art incorporate electro-optic, thermo-optic and liquid crystal tap elements.

Perhaps the most well developed waveguide/tap display technology relies on thermally-induced phase changes in a liquid core waveguide. In this approach, a liquid core fiber is heated externally through the cladding. At a critical temperature the liquid core vaporizes, causing a sudden drop in the core's refractive index. Light traveling through the heated, vaporized, core region is caused to scatter and can be seen by a viewer.

While the liquid core technique is promising, it has several major drawbacks which are representative of the flaws in other existing waveguide/tap designs. First, the time required to cycle through a liquid-vapor-liquid phase transition is typically in the millisecond range. A millisecond is far too long to enable a single fiber to display and update thousands of pixels/second.

Fiber taps must update pixels at rates greater than 30,000 pixels per second to produce a high resolution waveguide/tap display.

Second, the manufacturing processes needed to make a system of parallel liquid waveguides are new and have not been well developed. Since the manufacturing processes are new, liquid waveguides are presently expensive to produce. These two problems, designing high speed taps and economical optical waveguides, are common limitations to all previously proposed waveguide/tap displays. In other words, waveguide/tap displays have been described in theory, but have not yet been possible to build.

Consequently, while several waveguide/tap display methods have already been proposed, non can be used to produce an economical large panel display. Either the taps have been too slow or the fiber elements have been too costly to produce. Therefore, while preliminary work has shown optical waveguide/tap displays to be promising, improvements in the light tapping, waveguide forming, and source illumination elements must be made before this technique can be commonly applied to large panel screens.

Examples of relates patents included U.S. Pat. No. 3,871,747 issued Mar. 18, 1975 to Ronald Andrews; U.S. Pat. No. 4,640,592 issued Feb. 3, 1987 to Nishimura et al.; U.S. Pat. No. 3,856,378 issued Dec. 24, 1974 to Brandt et al.; U.S. Pat. No. 3,619,796 issued Nov. 9, 1971 to Seidel et al; U.S. Pat. No. 3,655,261 issued Apr. 11, 1972 to Change.

Other related art is disclosed by Manhar L. Sha, "Fast acousto-optical waveguide modulators", *Applied Physics Letters*, Vol 23, No. 2, Jul. 15, 1973, pp. 75-77; A. I. Gudzenko et al., "Acoustooptical modulator using coupled plane waveguides", *Opt. Spectrosc.*, (USSR) 47 (4), October, 1979, pp. 427-428; G. B. Brandt et al., "Bulk acoustic wave interaction with guided optical waves", *Applied Physics Letters*, Vol. 23, No. 2, Jul. 15, 1973, pp. 53-54; B. L. Heffner et. al., "Switchable fiber-optic tap using acoustic transducers deposited upon the fiber surface", *Optics Letters*, Vol. 12, No. 3, March 1987 pp. 208-210.; Ralph Th. Kersten, "Integrated optical acousto-optic switching", *Spie vol. 517 Integrated Optical Circuit Engineering*, 1984, pp. 258-266; L. Falcou et. al., "Switching characteristics of a piezoelectrical actuated evanescent-wave directional coupler", *Electron. Lett.*, Vol 23, 1987, pp. 469-470; K. Lieu "Single-mode-fibre evanescent polarizer/amplitude modulator using liquid crystals", *Opt. Lett.* Vol 11, 1986, pp. 180-182; Manhar L. Shah, "Fast acoustic diffraction-type optical waveguide modulator", *Applied Physics Letters*, Vol. 23, No. 10, Nov. 15, 1973; T. Tamir et. al., Integrated Optics, *Topics in Applied Physics*, Vol 7, Springer-Verlag 1985.

SUMMARY OF THE INVENTION

Objects of the Invention

Accordingly, it is an object of this invention to show how a display can be constructed by making guided light prematurely exit the cores of optical waveguides.

Another object of the invention is to show various high speed techniques for tapping light out of waveguides to form still and moving images across large screens.

A still further object of the invention is show how the acousto-optic and electro-optic effects can be employed to modulate and tap light out of optical waveguides.

Still another object is to show how to make and use a ribbon of parallel optical waveguides in waveguide-based displays.

Yet another object is to show how light absorbing material can improve the appearances of images formed in waveguide displays.

A further object is to show how filters, which convert white light into colored light, can be used to make full color waveguide displays.

Another object is to show various methods for integrating said waveguide and modulator elements into a complete display system.

These and further objects, features and advantages of the present invention will become more obvious from the following description when taken in connection with the accompanying drawings.

BRIEF DESCRIPTION

Briefly described, the invention comprises a substrate with optical waveguides arranged on it. The substrate can be made of glass, plastic or any other suitable material. The waveguides are typically parallel and closely spaced next to each other. The total number of waveguides placed in parallel across the substrate determines either the row or column resolution of the display.

Light is directed from a light source into the ends of the waveguides arranged across the substrate. Depending on the specific configuration of the waveguides and the light source, the best means for getting light into the many waveguide cores will differ. However, regardless of the approach employed, light must continuously flow through all of the waveguides for the display to function properly.

Due to total internal reflection, the guided light traveling through the optical fibers will only emerge from the ends of the fibers. Once bound in the core of a waveguide, light can not escape through the cladding material. Consequently, a person looking at a substrate with parallel optical waveguides arranged on it will normally not see light escaping from the surface of the substrate. Only light escaping from the ends of the waveguides which run across the substrate can be directly observed.

Various methods can be used to make light prematurely exit a waveguide through the cladding material, thus making it visible. These methods rely on diffraction effects, evanescent field coupling, surface irregularities, microbending and changing the index of refraction in the waveguide core and cladding. These phenomenon can be made to occur electronically using the electro-optic, acousto-optic, thermo-optic or magneto-optic properties possessed by many materials. Any of these effects can be utilized to tap light out of a waveguide and make a display like the one described here.

In particular, the acousto-optic effect is used in the preferred embodiment of this invention. Acoustic waves cause physical displacement, which, in an optical medium, it typically accompanied by changes in the index of refraction. By applying acoustic energy to specific points, light can be made to exit anywhere along a length of waveguide. To a viewer, this tapped-out light appears as a point of light which is present at the location where acoustic energy is applied to the waveguide. The position and intensity of the emitted light can be adjusted by changing the location and power of the applied acoustic energy.

Tapping light out of the core with acoustic energy both modulates the intensity of the remaining bound light traveling through the waveguide and makes a visible point. This ability to modulate the intensity of light in a waveguide, as well as making light visible anywhere along its length, can be used to conveniently make points of varying brightness along a one-dimensional segment of waveguide. To do this, an intensity modulator is followed by a series of taps placed along a waveguide segment.

The intensity modulator controls the total amount of light traveling through the core, while taps couple the remaining intensity modulated light out and make it visible at different locations along the waveguide. By placing many one-dimensional intensity modulator/tap waveguide segments in parallel, closely spaced next to each other, the light emitted from a two-dimensional surface can be regulated. By systematically controlling the intensity modulators and taps in a two-dimensional system of waveguides, still and moving images an be formed on a viewing screen.

The attainment of the foregoing and related objects, features and advantages of the invention will be more readily apparent to those skilled in the art, after review of the following more detailed description of the invention, taken together with the included drawings.

DRAWING REFERENCE NUMBERS

Figure 1:
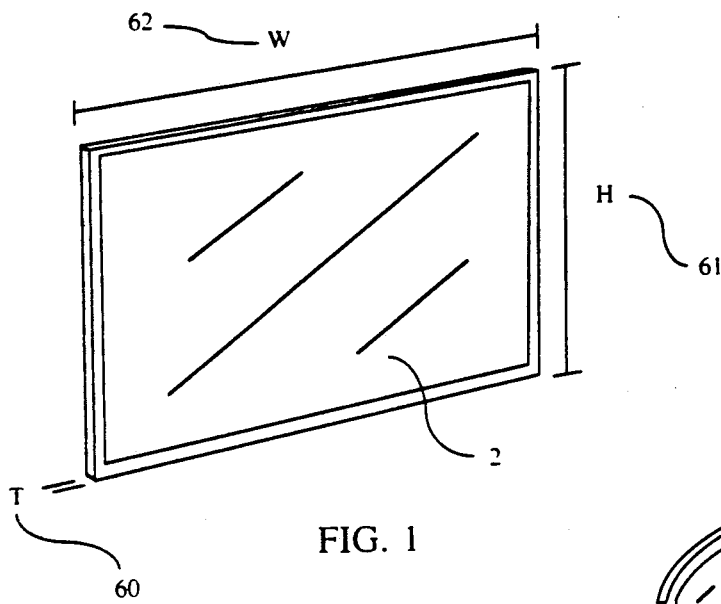
FIG. 1 is a perspective view of a flat panel display.

1 Substrate (i.e.—glass or plastic)
2 Viewing screen
3 Direction light travels to the viewer
4 Base containing decoder, drive electronics and light source
5 Direction of bound light traveling in the waveguide
6 High-voltage pulse used to create a traveling acoustic wave
7 Angle of light acceptance
8 DC voltage
9 Direction travelling acoustic wave propagates across substrate 1
10 High frequency oscillator used to drive piezoelectric layer 16
12 Ground
14 Conductor used for drive signals (i.e.—DC 8, high frequency 10 and pulse 6)
15 Conductor associated with ground 12
16 Piezoelectric material—(i.e.—ZnO)
18 absorber (i.e.—black glass)
20 High index difference cladding relative to core
21 Light entering waveguide core
22 Core
24 Low index difference cladding relative to core
26 Light diffusing material
27 Bound light in waveguide
28 Bound light exiting waveguide
30 Light viewer can seen from the diffusing material
32 Bound light coupled out of waveguide core and being scattered by the diffusing layer
34 Acoustic wave
35 Regions where there is little acoustic energy
36 Total internal reflection
38 Total internal reflection in acoustic field because of high refractive index difference between cladding and core
40 Bend region where light can escape the core
42 Electro-optic material
44 Total internal reflection in bend due to high index difference between the cladding and core
46 Electric field
48 Transparent conductor
50 Point light source
52 Focusing lens
54 Prism coupler
55 Air gap for evanescent coupling
56 Light from light source
58 Penetration into electro-optic material
60 Panel thickness
61 Panel height
62 Panel width
64 Conductor associated with tap
66 Conductor associated with intensity modulator
68 Light exiting core at tap 64
70 Light exiting core at intensity modulator 66
72 Traveling acoustic wave used to cause bending region 72
74 Direction of wave travel
76 Acoustic focusing horn
78 Movement of horn due to acoustic wave 34
80 Two-sided PC board
82 Integrated circuit
84 Xenon arc lamp
86 Optical waveguides deposited on substrate 1
90 Beam focused onto ends of waveguides 86
92 Waveguides deposited over light diffusing material 26
94 Interaction region where light is tapped out of the waveguide
95 Ribbon waveguide cores imbedded in cladding material
96 Cladding material with large index difference relative to ribbon cores
98 Cladding material with small index difference relative to ribbon cores
100 Opaque medium imbedded in ribbon light diffusing material 131
102 Bend where ribbon is folded to change direction 90 degrees
104 Ribbon ground conductor 106 Ribbon modulator and tap conductor
108 Small intensity modulator signal
110 Large intensity modulator signal
112 Tap drive signal
114 Large amount of light emitted from modulator associated with large drive signal 110
116 Some light emitted from modulator associated with small drive signal
118 No light emitted from modulators with no drive signal 126
120 No light emitted from tap associated with modulator 114
122 Large amount of light emitted from taps associated with modulators
124 Some light emitted from tap associated with modulator 116
126 Modulator conductors with no electric drive signal
128 Tap being driven with signal from source 112
130 Waveguide ribbon
131 Ribbon light diffusing material
132 Line-type light source
133 Collimated beam of light
134 Colored light after leaving filter
135 Focused light entering stack of ribbons
136 Stack of ribbons
138 Focusing element to direct light into ribbon cores
140 Color filter unit
142 Focusing unit takes collimated light and directs it into cores in a stack of ribbons
144 Opaque material over clear substrate 1
146 Opening in opaque cover 144 to allow light from ribbon taps 148 to reach viewer
147 Ribbon modulator conductor
148 Ribbon tap conductor
150 Space between ribbons
152 Segment of PC board that modulates light-flow in waveguides—contacts 147 and 104
154 Segment of PC board that controls where light exits—contact taps
156 Red, Green and Blue (RGB) elements of filter

DETAILED DESCRIPTION OF THE INVENTION

Waveguide Displays—Sizes, Shapes and Types

Figure 2:
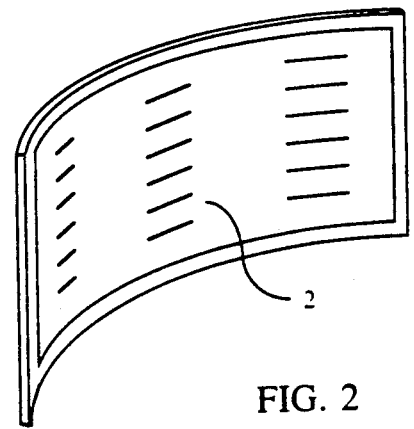
FIG. 2 is a perspective view of a curved display.
Figure 3:
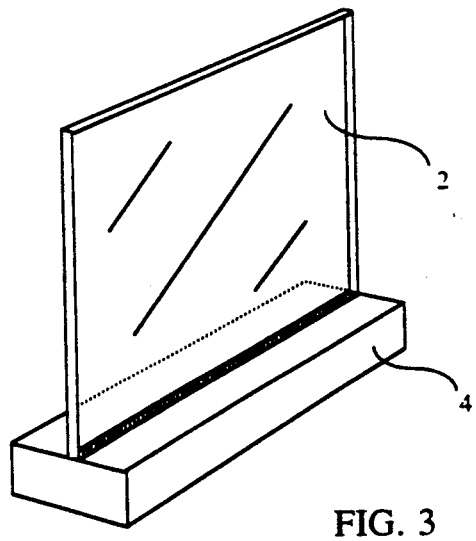
FIG. 3 is a perspective view of a semi-transparent flat display

Turning now to the drawings, more particularly to FIGS. 1-3, which show three basic types of display that can be constructed using the optical waveguide methods introduced above. FIG. 1 is a perspective view of a flat panel screen 2 labeled along is height 61, thickness 60, and width 62 dimensions.

It is important to note the small screen thickness 60 of an optical waveguide display. Optical waveguides are capable of carrying extremely intense light, long distances, with little attenuation. This robust light carrying ability enables a single waveguide, 10-250 uM thick, to brightly illuminate hundreds of pixels (taps) oriented along its length. Consequently, because the light carrying ability of optical waveguides is so great, the panel thickness 60 can be made very small. Depending on the thickness of the substrate, waveguide panels 0.05-2 cm thick can be obtained.

Optical waveguides may be built from a number of different clear materials. Commonly used waveguide materials include gases (air, nitrogen), liquids (water, carbon tetrachloride), plastics (acrylic, polyimide) and glasses (crown, flint, silicon dioxide). In advanced telescommunications waveguides, the attenuation due to absorption and refractive imperfections has been greatly reduced. For example, in commercially available silica fibers, the attenuation is less than 2 dB/Km. Consequently, waveguide/tap screens can incorporate very long optical waveguides before attenuation becomes a major design limitation.

Large viewing screens may be made using long, low-loss waveguides. For example, optical fibers more than 10 kilometers long are routinely formed using traditional heating and stretch-drawing techniques. These long fibers can individually be placed, side-by-side, on a separate clear substrate. Clear substrates are presently also available in very large sizes. As a result, since the basic elements of the display, both the waveguides and the substrate, can each be manufactured to large sizes, the screen itself can be made large. It is not realistic to expect viewing screens 3-5 meters on a side.

In fact, it is more of a challenge to make small screens. The resolution of a waveguide/tap display is constrained by the smallest screen pixel which an be displayed. The minimum pixel size is determined by the size nd efficiency of the tap placed along the length of a waveguide. Presently, taps which are both efficient and small are difficult to fabricate. The precise technical reasons for the limited efficiency and relatively large tap size will be made more clear in the next section. However, the smallest useable tap is likely to be 1 mm in length. Assuming a 1 mm tap, a waveguide HDTV with 1024×1024 pixels, or taps, will measure 1 meter/-side.

FIG. 1 shows a curved display. Until now, thin displays have been limited to flat, planar, designs. The photolithographic techniques commonly used to produce matrices of electrodes in liquid crystal and electro-luminescent panels necessitate flat exposure masks and substrates. This planar-based production equipment cannot be used with curved and other irregularly shaped substrates.

However, since waveguide/tap displays are based on optical waveguides, which do not require a matrix of electrodes, curved and other irregularly shaped screens can be created. For example, fiber can be stretch-drawn, then further processed to create taps along its length, and finally placed over a curved substrate. Stretch-drawing and processing the fiber to create taps first, and then separately placing fibers over a substrate, eliminates the need for a flat substrate. Separating the fiber and substrate processing steps allow irregularly shaped screens to be made without using traditional photolithographic processing steps.

Curved screens are potentially very useful. For example, if the optical fibers are long enough, a curved screen can be made which wraps 360 degrees around a viewer. Such a wrap-around display will greatly improve the cinemagraphic and video viewing experience. A viewer will have the impression of actually "being" in the center of a displayed picture.

FIG. 3 shows a semi-transparent panel. In contrast to present displays, which are opaque, this screen allows an individual to see through it. Transparent screens are possible due to the inherently clear nature of optical waveguides. A viewer can look through the side of an optical waveguide, while light is flowing through the core, without seeing any of the guided light. As a result, with the appropriate configuration of clear waveguides and clear taps, semi-transparent panels can be made.

Semi-transparent displays will be useful of a number of new and novel applications. For example, public store windows could be made to show messages and moving images, while at the same time allowing a customer to see what is going on inside the store. Also, artists might use such semi-transparent displays to make dramatic art exhibits.

Optical Waveguide Taps

FIGS. 4-9 show five different types of optical waveguide tap. As previously mentioned, the tap is the central component of a waveguide/tap display. Taps are responsible for directing light out from the waveguide core to the viewer. Ideally, display taps must switch quickly, consume little power, and be easy to fabricate. These tap properties can be realized using a number of different designs based on acousto-optic, electro-optic, thermo-optic and/or magneto-optic effects. This section will focus on acousto-optic and electro-optic taps. It is important to note, however, that taps based on other effects may be substituted in place of the described acousto-optic and electro-optic taps. In particular, thermo-optic and liquid crystal taps are very promising and might also be used.

Figure 4:
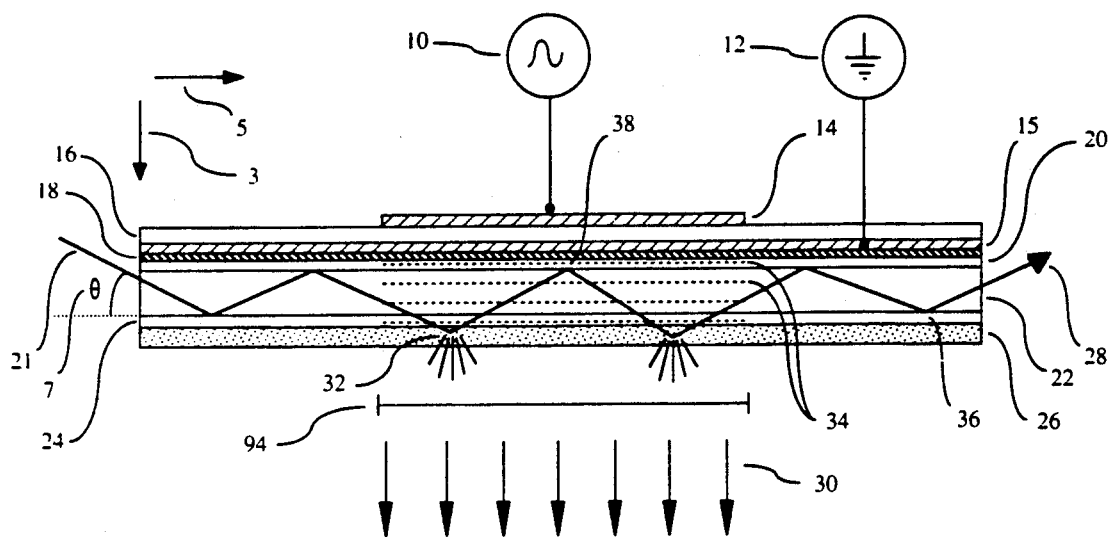
FIG. 4 is a cross section view of an optical waveguide and acousto-optic tap.

Turning now to FIG. 4, which shows a side-view of an acousto-optic waveguide tap, in which sound energy is employed to make light prematurely exit a waveguide core 22. When the tap is in operation, sound waves 34 propagate perpendicular 3 to the direction of light flow 5 in the waveguide. The changes in the index of refraction produced by sound passing through the cladding 20, 24 and core 22 layers cause light to couple out at 32 and travel to the viewer 30.

Light must initially be traveling through the waveguide core 22 for it to be switched out in a tap region 94. For light to remain guided by total internal reflection in the waveguide, light must have an angle of propagation 7 less than the critical angle. The critical angle of light acceptance for a given waveguide is determined using Snell's law. It is calculated by knowing the index of refraction of the core 22 and cladding layers 22, 24. Light entering a waveguide at angles greater than the critical angle will not be guided by total internal reflection and will quickly dissipate due to propagation in high-loss cladding and radiant modes.

The sound source, typically a piezoelectric material 16 sandwiched between a ground conductor 15 and a signal conductor 14, is placed alongside the waveguide. The piezoelectric layer can be made of any suitable piezoelectric material including zinc oxide, barium titanate and polyvinylidene fluoride. In operation, an alternating electric signal from a source 10 is connected to the signal conductor 14. The alternating electric signal, in turn, causes the piezoelectric layer to produce periodic acoustic waves. The periodic acoustic waves 34 travel into the cladding 20, 24 and core 22 where they cause changes in the index of refraction. Changes in the index of refraction induced by acoustic waves are ultimately responsible for making light prematurely exit the core 22. Without acoustic energy 34 in the tap region 94, light will exit the waveguide at the end 28 with virtually the same intensity as when it entered 21.

Depending on the frequency and amplitude of the applied acoustic energy, and also on the precise construction of the optical waveguide, different mechanisms account for how the light exits from the waveguide. In ordinary commercial waveguides, periodic sound energy mostly produces refractive and diffractive effects. These diffractive and refractive effects modify the path a bound light ray takes when traveling through the waveguide core 22. The precise light ray path changes produced by sound induced diffractive and refractive effects in ordinary commercial waveguide depends on the frequency and amplitude of the applied acoustic energy.

If the applied acoustic frequency is low, less than approximately 100 MHz in glass, the path of a guided light ray will be altered due to diffraction in the Bragg regime. On the other hand, at higher acoustic frequencies light diffraction will occur in the Raman-Nath regime. Diffraction in both Bragg and Raman-Nath regimes can be used to tap light from a core in an acousto-optic interaction region 94.

Ultimately, it is an increase in the angle of light propagation induced by acoustic perturbations which cause bound light to exit from the core 22. Changes in the angle of propagation convert guided light to both higher and lower order propagation modes. Guided light in a high order mode has a higher angle of light propagation than guided light in a low order mode. In the acousto-optic interaction region 94 mode conversion from a low order mode to a very high-order mode will cause light to exit from the core into the cladding 24. Once in the cladding 24, light exiting the core can be scattered and directed to the viewer 30. Thus mode conversion, or increasing the angle of propagation of the bound light, is one important mechanism for achieving core light removal in a waveguide tap.

The amount of light exiting at a tap from mode conversion can be quite large. An acoustic tap is particularly effective if the guided light traveling through the tap region 94 is weakly guided, or already in a high-order mode. If most of the light traveling through a waveguide is weakly guided, a slight acoustically induced mode conversion will cause it to escape into the cladding. Thus, the mode of the guided light is a key factor in determining the efficiency of a particular acoustic tap.

Light exiting from the core, once in the cladding, must be scattered before it can be viewed. In a tap region 94, light which has just entered the cladding 24 will tend to be oriented parallel 5 to the waveguide core 22. Thus, unless redirected, this tapped light will continue to travel through the cladding 24 and as a result will not be seen. In fact, light exiting the core may travel quite long distances through the cladding before it is scattered out to the viewer 30. Therefore, a scattering means is required for directing light out of the cladding and to the viewer.

There are several major ways of re-directing, or scattering, light out of the cladding 24 to the viewer 30. The first scattering technique employs a diffusing layer 26. The diffusing layer 26 is made of a base material whose index of refraction closely matches the cladding layer 24. Embedded in the base material are small particles, each with a different index of refraction than the base material. The difference in the index of refraction between the base material and the particles cause light to be re-directed. In other words, each particle in the base medium tends to act as a scattering center to diffuse light in the cladding. The combined effect of many small particles 26, or scattering centers, placed in close proximity cause light to be directed out of the diffusing layer and toward the viewer 30.

The second major scattering approach (not shown) employs a transparent layer with lenses formed on it. The transparent layer, like the diffusing layer, is usually placed in contact with the outside cladding 24. Ideally, the transparent lens layer should have an index of refraction which closely matches the cladding 24. It is even possible to form lenses directly on the outside of an extra-thick cladding 24. Lenses serve to refract light traveling through the cladding away from the core 22 and toward the viewer 30.

Lenses can be formed by etching irregularities directly onto the surface of a clear material. In fact, the irregularities need only be a random collection of microscopic bumps and pit to effectively refract and redirect light. Thus, minute surface variations, essentially random in nature, are sufficient to scatter and redirect light.

Ideally, light from the core 22 is so completely re-oriented, from either lenses or the diffusing layer, that it has a lambertian intensity profile. In other words, light exiting the waveguide 30 in the interaction region 94 should appear to the viewer as a diffuse, planar, light source. Light tapped from the waveguide must be sufficiently dispersed to enable a viewer to see the tap from many different viewing angles.

There is an entirely different type of acousto-optic waveguide tap, based on effects other than refraction and diffraction, which may also be employed. This other tap method is based on evanescent field coupling. Evanescent field coupling takes advantage of the electromagnetic field of guided light which extends outside of the core and into the cladding. This field enables guided light to interact through the cladding 24 with materials placed very close to the waveguide core 22.

For example, if two waveguide cores are placed in close proximity guided light, via its associated evanescent field, will "tunnel" across from one waveguide core to the other. A coupler using this effect is commonly used in fiberoptic communication systems. Such evanescent couplers place two fiber optic waveguides at close distances, approximately 1-5 um apart, to enable light to transfer from one fiber to the other fiber. 100% transfer of light between two waveguides can be obtained using this technique.

In specially designed optical waveguides, a very effective tap based on the evanescent field effect can be built. For example, if the bottom cladding 24 is made sufficiently thin, light can be efficiently coupled out of the core and into the diffusing layer via its evanescent field. This light tapping method is extremely sensitive to the thickness and refractive index of the cladding 24 between the core and the diffusing layer 26. If the thickness and refractive index of the cladding layer is carefully controlled, light will escape from the waveguide through the application of very small amounts of acoustic energy.

An interesting property of the evanescent tap is that it reduces the scattering requirements needed in he diffusing layer 26. The scattering requirements of the diffusing layer are reduced because light exiting from the core can be more directed toward the viewer 30. In particular, the angle of light coupled out from the core into the diffusing layer 26 can be made to be strongly angled in direction 3. This angling is made possible by making the index of refraction of the base diffusing material larger than the index of the refraction of the core. It is the higher index of refraction in the diffusing base material which causes light to be angled in direction 3. The more light is angled toward the viewer 30, the less scattering needs to be done in the diffusing layer 26.

Evanescent taps are also useful because they do not require periodic sound energy. Unlike Bragg and Raman-Nath diffraction taps, light can be coupled out of an evanescent tap simply by applying constant pressure to the interaction region 94. Thus, evanescent coupling taps can operate at much lower acoustic frequencies than diffraction-based taps.

In both the diffractive, refractive and evanescent tapping schemes, an important consideration is the distance light must travel in the interaction region 94 for a significant proportion of it to make it out of the core 22. The goal is to get as much light to couple out of the core 22 and scatter to the viewer 30 in as small an interaction region 94 as possible. The length of the interaction region 94 determines the minimum size of a pixel. The smaller the interaction length, the smaller pixel the display can use. Small pixels allow more information to be put on a viewing screen of a given size.

The interaction length 94 depend on the index of refraction and dimensions of the core 22, cladding 20, 24 and diffusing layer 26 materials, the amplitude and frequency of the acoustic energy, and the mode distribution of light propagating through the core. Since detailed analytic work is not yet available, the exact length and efficiency of a particular tap can only be approximated. However, based on papers published by Manhar L. Shaw, G. B. Brandt and A. I, Gudzenko, it is reasonable to assume 50-70% of the light in the core can be coupled out in an interaction region 1-2 mm in length. Also based on their work, the power required to couple light out from a waveguide is estimated to be 10-100 mW/cm2. Future improvement should reduce the minimum interaction length and power requirements of acousto-optic taps.

The switching speed of an acousto-optic waveguide tap is extremely fast. The rate of response is determined by the transit time of an acoustic wave propagating perpendicular, in direction 3, through the waveguide cladding and core. Since longitudinal sound waves travel through glass at approximately 3000-5000 meters/second, and the typical waveguide is 10-100 um thick, the transit time of an acoustic wave through the waveguide core is approximately 3-30 nanoseconds. With such fast transit times, an acousto-optic tap can be expected to switch at 30-300 MHz. This switching speed is more than fast enough for use in a HDTV system. A waveguide/tap HDTV only needs a single fiber tap to switch at 30,000 Hz.

Figure 5:
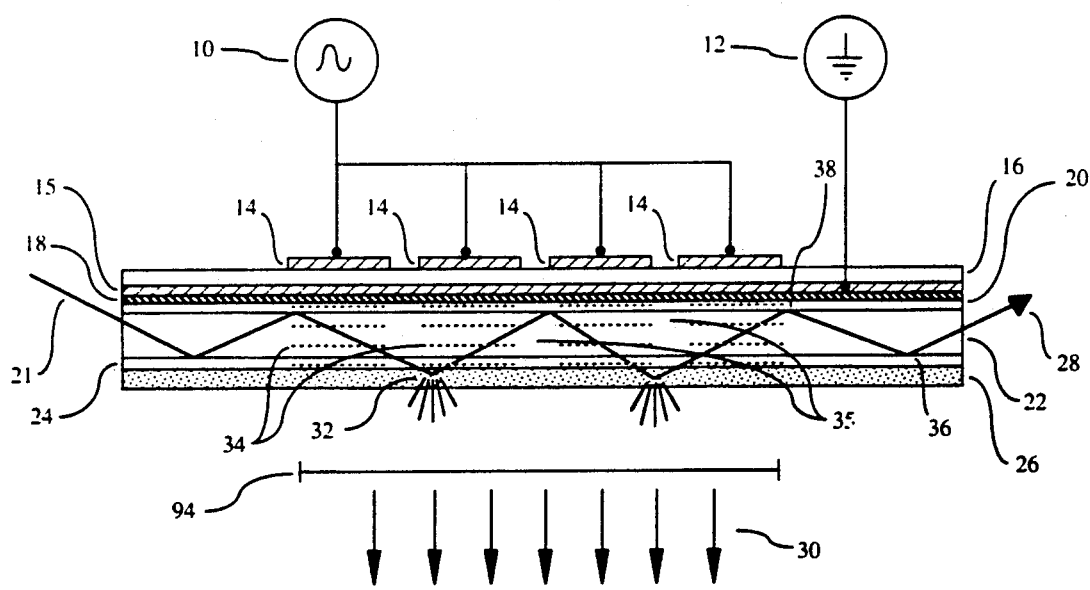
FIG. 5 is a cross section view of a waveguide and acousto-optic tap employing a series of closely spaced acoustic sources along a length of waveguide.

FIG. 5 shows an acoustic waveguide tap similar to the tap shown in FIG. 4. However in this tap, mode conversion is effected by a series of small transducers 14 placed along a length of waveguide 22. Each signal conductor 14 in the interaction region 94 is connected to a source 10. The frequency of the source 10 can be adjusted so the acoustic wavelength generated by the piezoelectric material 16 is less than the length of the signal conductors 14. If the ratio between the (signal conductor length)/(acoustic wavelength) > 1 the acoustic energy 34 from the piezoelectric layer will propagate downward 3 in relatively collimated beams.

Collimated acoustic beams, interspersed between inactive regions 35, cause irregular indexes of refraction in the core 22. The irregular core index of refraction facilitates the transfer of guided light into cladding and radiant modes. The irregular core 22 index or refraction produced by spacing a series transducers along a waveguide segment enable this tap to operate at relatively low acoustic frequencies. Low acoustic frequencies simplify the drive electronics 10 needed to control the piezoelectric layer 16.

It is important to comment on how different types of acoustic energy effect light traveling through an optical waveguide. Depending on how the piezoelectric layer is formed, either longitudinal or shear acoustic waves can be generated. Longitudinal and shear waves have different effects on guided light at different frequencies.

For example, at low frequencies longitudinal acoustic waves mostly cause phase changes in guided light. Shear waves typically cause mode conversion. Mode conversion is preferred to changing the phase because phase changes typically do not efficiently tap light out from a waveguide core. However, at very high frequencies, such as 500-1000 MHz, diffractive effects caused by longitudinal waves can also cause mode conversion. Therefore, depending on the frequency, both longitudinal and shear acoustic energy may be used in an acousto-optical waveguide tap.

Figure 6:
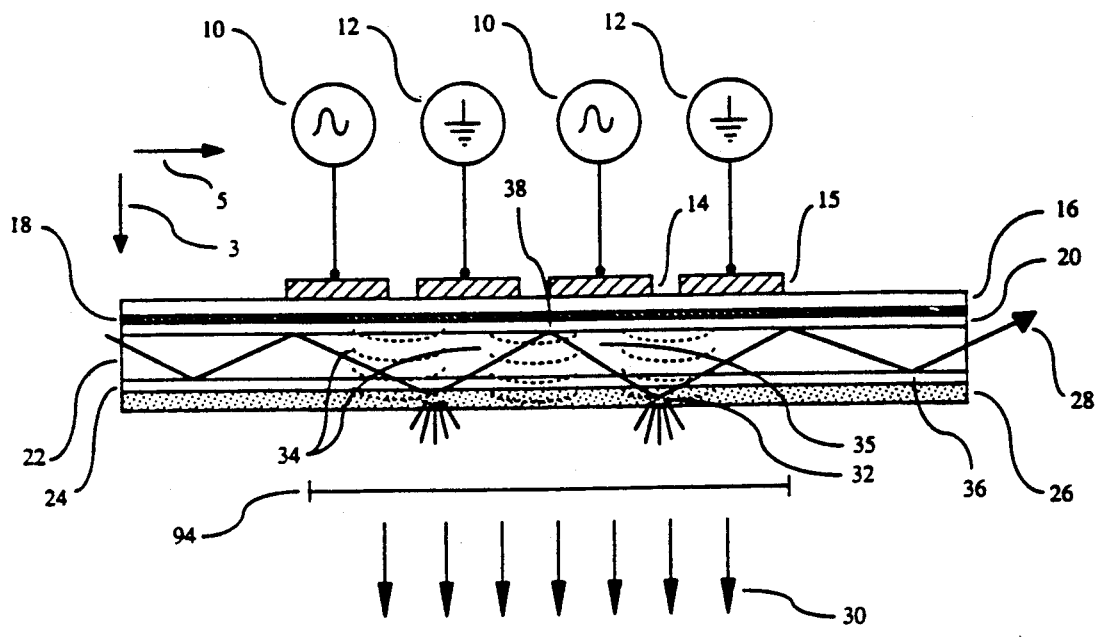
FIG. 6 is a cross section view of an interdigital acousto-optic waveguide tap with electrodes placed on the same side of a piezoelectric material.

FIG. 6 shows an interdigital tap which has the signal 14 and ground 15 conductors on the same side of the piezoelectric layer 16. Placing the signal 14 and ground 15 conductors on top, where they are accessible, is an important aspect of the invention. Since there is an opaque layer 18 positioned between the viewer and the tap electrodes, it is not possible to see beyond the diffusing 26, core 22 and cladding layers 2, 420. Thus, wires and control electronics can be placed directly on the back of the screen without affecting the screen image.

Due to the arrangement of the interdigital electrodes in the tap shown in FIG. 6, a decay in the intensity of the electric fields between the signal 14 and ground 15 conductors causes the acoustic energy 34 produced in the piezoelectric layer 16 to have a complex shape. This acoustic energy, in spite of its irregular shape, is still able to couple light out of the core via the refractive, diffractive and evanescent mechanisms described above.

The ability to place opaque electronics and control wires directly on the back of the waveguide simplifies the display manufacturing process. In particular, standard electronic components can be used instead of exotic and special purpose elements. For example, present matrix-electrode screens require transparent control electrodes. Transparent control electrodes are both expensive and prone to failure. In contrast, the acoustooptic tap electrodes can be formed with opaque conductors. Since many well characterized opaque conductors exist, the reliability of the tap manufacturing process can be increased.

Figure 7:
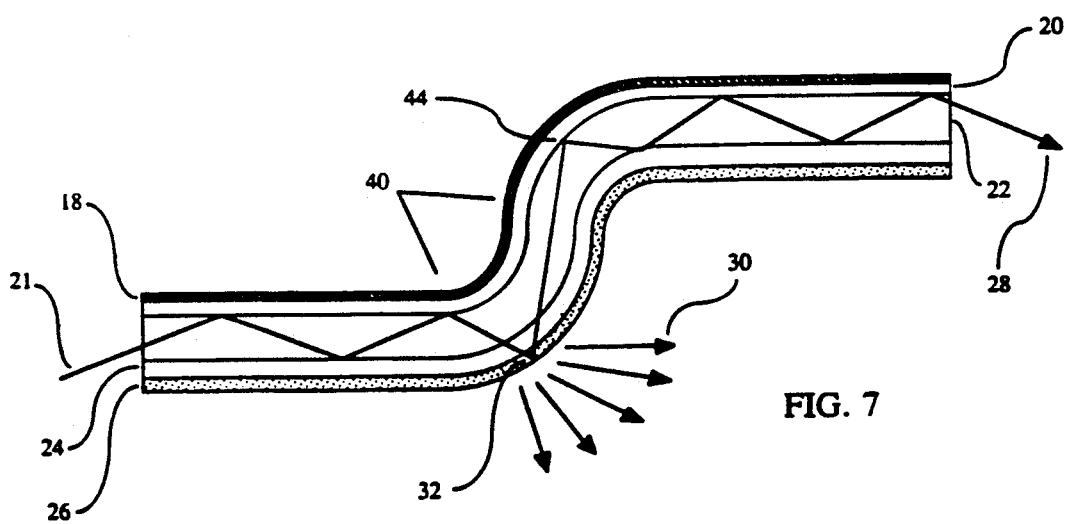
FIG. 7 is a cross section view of a waveguide leaking light due to microbending.

FIG. 7 shows how light can be tapped out from large scale bending of a waveguide. Bending, or microbending, causes light to escape by tunneling and refractive effects. If the bend region 40 is made small relative to the waveguide thickness, these effects will cause a significant fraction of the light to escape into the cladding. Once in the cladding, light is scattered 32 by the diffusing layer and made visible 30. Microbending provides yet another powerful technique for mechanically tapping light out from a waveguide.

Different methods can be used to effect waveguide microbending. In one approach, bending can be caused in a localized waveguide region 40 with actuators. An actuator physically displaces the waveguide enough to bend 40 and couple light out 30. However, the use of waveguide actuators in a display is impractical because mechanisms capable of sufficiently bending a waveguide are bulky. In addition, the many actuators needed to cover a screen make the actuator approach prohibitively expensive.

In a related approach, a traveling acoustic wave can be used to form a moving microbending region 40. To accomplish the microbending, a high intensity traveling acoustic wave is launched at one end of a waveguide and allowed to propagate down its length. The induced microbending region 40 moves as the traveling acoustic wave propagates down the length of the waveguide. The microbending caused in this region, in turn, allows light to escape 32 from the core 22 and become visible 30. Thus, a traveling acoustic wave can be used to automatically scan a length of waveguide. The traveling acoustic wave microbending method will be discussed in greater detail in the next section.

Figure 8:
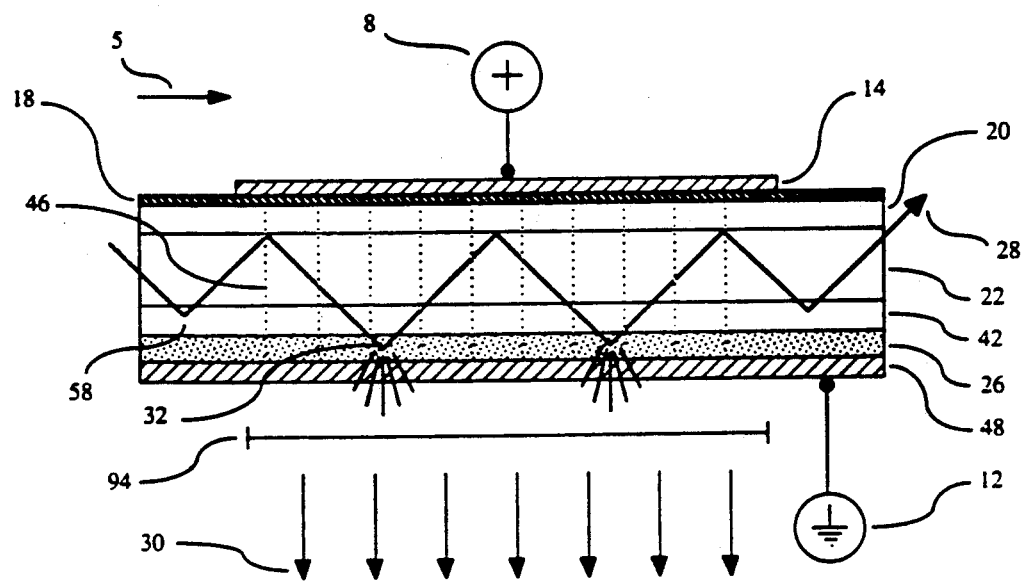
FIG. 8 is a cross section view of an electro-optic waveguide tap.

An entirely different type of waveguide modulator employing the electro-optic effect is shown in FIG. 8. Certain materials, in the presence of an electric field, directly change their index of refraction. Examples of electro-optic substances include $LiNbO_3$, $LiTaO_3$ and $ZnO$. While the change in the index of refraction caused by an electric field in such materials is extremely small, it is often enough to make weakly guided light exit a waveguide.

In FIG. 8 light enters the core and propagates in direction 5 through the interaction region 94. The top cladding layer 20 is made of a low index, non-electrooptic material. The low-index top layer strongly guides light as it propagates through the interaction region. The bottom cladding layer 42 is made of an electro-optic material whose index of refraction can be changed by applying an electric field. The ground conductor 48 consists of a transparent electrode 48 deposited over the diffusing layer. When a voltage difference is applied between the bottom ground conductor 48 and the top control electrode 14, an electric field 46 causes the electro-optic cladding layer 42 to increases its index of refraction. If the light is already weakly guiding 52 an increase in the cladding index of refraction will cause it to penetrate into the diffusing layer 32. Once in the diffusing layer light scatters 32 and passes through the transparent ground conductor 48 to the observer 30. Evanescent effect couplers based on the electro-optic effect may also be built.

Figure 9:
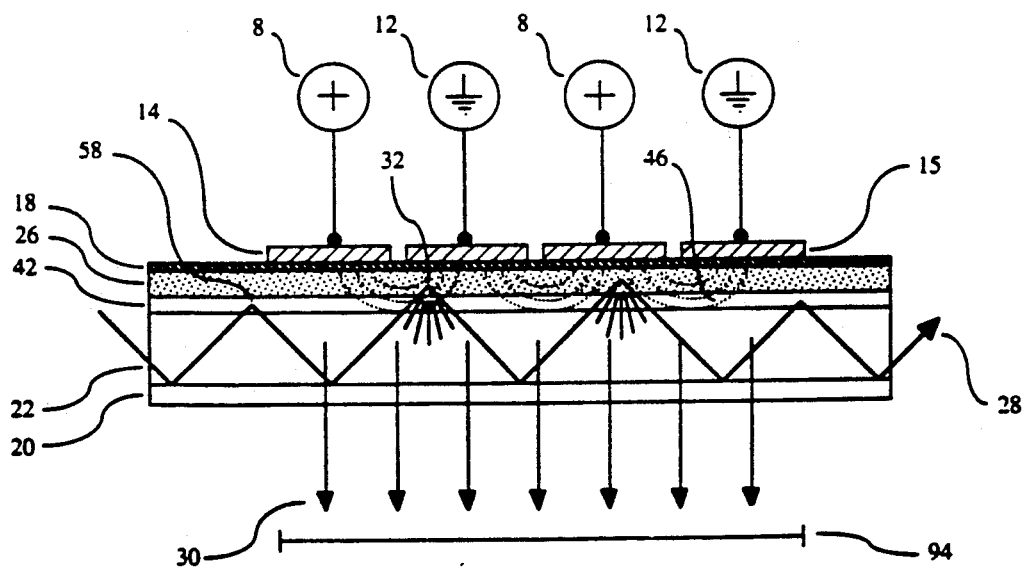
FIG. 9 is a cross section view of an interdigital electro-optic waveguide tap.

FIG. 9 shows an interdigital electro-optic waveguide modulator. The rationale for the interdigital electro-optic modulator is, again, to place all of the control electrodes on an exposed side of the waveguide to ease the manufacturing process. In practice, the interdigital electrodes cause an electric field 46 to penetrate through a non-electro-optic diffusing layer. The electric field causes the electro-optic cladding layer 42 to increase its index of refraction. Changes in the index of refraction cause light to penetrate up through the cladding into the diffusing layer 32 where it is scattered. Scattered light ultimately passes back through the waveguide core 22 and bottom cladding 20 layers and can be seen by a viewer.

To make the previously discussed waveguides work efficiently, many parameters must be properly adjusted. These parameters include the index of refraction, composition nd thickness of the core 22, light diffusing layer 26 and cladding layers 20, 24. In particular, it is advantages to make the difference in the index of refraction between the core 22 and the top cladding layer 20 greater than the different between the core 22 and bottom 24 cladding layer. If the top and bottom cladding layers have the same index of refraction, half the light will exit the waveguide in the interaction region 94 and be absorbed by the upper opaque absorption layer 18.

Absorption of light in opaque layer 18 decreases the efficiency of the display because absorbed light can not be scattered and seen by a viewer, Different indexes of refraction between the two cladding layers will cause the top cladding layer 20 to more strongly guide light than the bottom cladding layer 22. Thus, even in the tap region 94, light will not escape through the top cladding 20 and be absorbed by the opaque absorption layer 18.

Intensity Modulator/Tap Waveguide Segments

Figure 10:
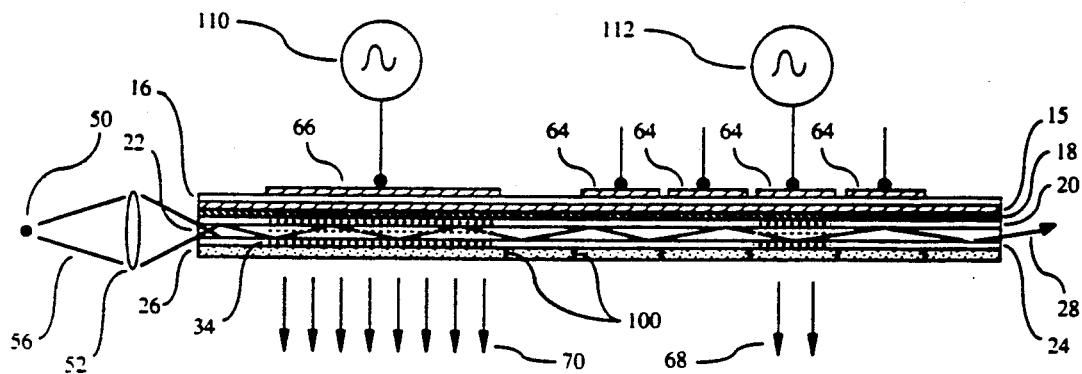
FIG. 10 is a cross section view of an acousto-optic intensity modulator followed by a series of acousto-optic taps to control the location and intensity of light emitted from a waveguide segment.
Figure 11:
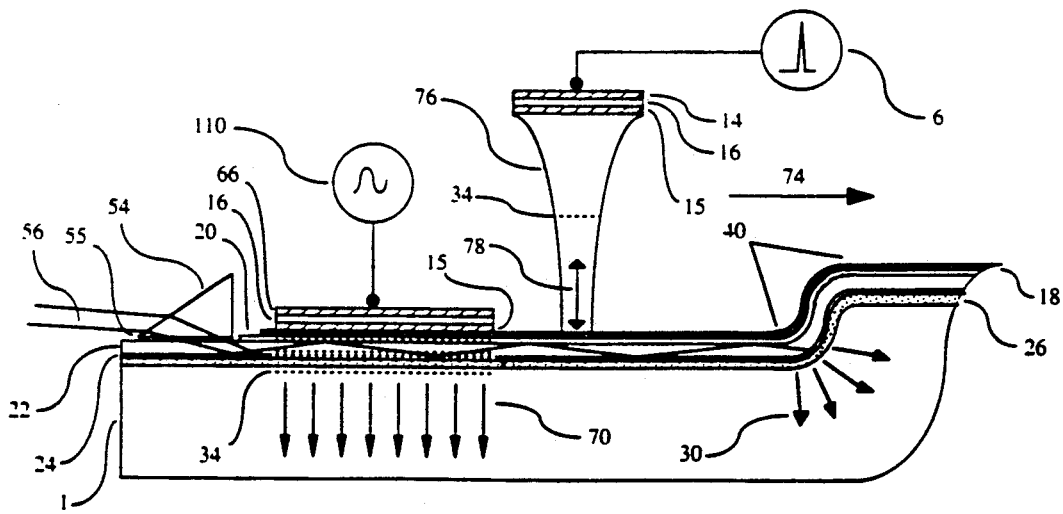
FIG. 11 is a cross section view of an acousto-optic intensity modulator and traveling acoustic wave which can be used to vary the intensity of light emitted from a length of waveguide.

FIGS. 10 and 11 show two different types of intensity modulator/tap waveguide segments. An intensity modulator/tap waveguide segment serves as a basic display building element. It enables the brightness of pixels oriented along the length of a waveguide to be conveniently controlled, Many modulator/tap waveguide segments, placed next to each other, are used to cover a two-dimensional viewing area.

FIG. 10 is a segment of waveguide incorporating acousto-optic intensity modulators and taps. This waveguide segment is divided into two parts: the intensity modulator—which controls the amount of light flowing through the waveguide; and the tap—which switches intensity modulated light out of the core to the viewer at different locations along the length of the waveguide. The brightness of a pixel is controlled by the intensity modulator and is visible location by a tap. This separation of the intensity modulator from the taps is important when trying to control the brightness of many pixels across a large two-dimensional surface.

In practice, light originating from a source 50 is focused 52 into the waveguide core 22. Once inside the core, light propagates with little loss until is forced out in an acousto-optic interaction region. If left undisturbed, bound light will exit at the end of the fiber 28.

The intensity of light traveling through the waveguide is first controlled by the intensity modulator 66. Light coupled out in the intensity modulator region 70 is typically blocked and is not intended to be directly viewed. The purpose of the intensity modulator is to regulate the amount of light reaching the taps 64 in a later section of the waveguide. Modulated light from the intensity modulator 66 continues through the waveguide until it reaches a tap 64 connected to a signal source 112. The acoustic energy at an active tap 34 forces the remaining light to exit and become visible 68

The opaque light block 100 imbedded in the diffusing layer separate pixels placed along the length of a waveguide. Light coupled out of the core 22 will typically scatter in many different directions. The scattered light will cause pixels to be poorly defined and make the screen image look fuzzy. To correct this problem and sharply define a pixel, light barriers are formed by masking and etching the diffusing layer 26. Groves formed from the etching process are filled with an optically opaque material. Light blocks 100 keep light strictly confined to the pixel interaction region.

FIG. 11 is an alternative form of waveguide intensity modulator/tap. Instead of taps 64, this technique utilizes a traveling acoustic wave 74 to cause a micro-bending region 40. Light traveling in the waveguide through the microbending region 40 is coupled out and made visible 30 by refractive and tunneling effects. As the traveling, acoustic wave-induced microbending region moves, the light intensity in the waveguide can be adjusted by the intensity modulator 66.

Using a traveling acoustic wave to produce a moving microbending region eliminates either the row or column address lines common to most flat panel displays. Since the acoustic wave automatically travels away from the source 76, it can be used to scan the length of a waveguide. Using a traveling acoustic wave to automatically scan the length of a waveguide eliminates either the row or column address lines. Eliminating the address lines allows semi-transparent screens, like the one shown in FIG. 3, to be produced, since tap electrodes are not needed over the screen display area.

FIG. 11 details how the traveling acoustic wave system works. Initially, light from a light source 56 is launched into the waveguide core 22 with a prism coupler 54. The prism coupler transfers light into the core 22 using an evanescent field across an air gap. This light transfer method is similar to the evanescent field waveguide couplers discussed above. A related waveguide light coupling method might employ diffraction gratings.

Once bound in the waveguide, the intensity of the guided light is controlled by an intensity modulator 66. The intensity modulator 66 is similar to the acousto-optic tap shown in FIG. 4. Acoustic energy 34 from a piezoelectric layer 16 passes through the waveguide cladding 20, 24 and core 22. Light coupled out from the acousto-optic interaction 70 regulates the amount of light traveling through the remainder of the core 22. Intensity modulated light is ultimately tapped out to the viewer 30 in the traveling microbending region 40.

To create the microbending region 40, a pulse from a signal source 6 is required. The pulse causes a high intensity acoustic wave 34 to propagate through a tapered horn 76. The horn magnifies the amplitude of the sound from the acoustic source. The interaction of the horn 78 with the waveguide causes a traveling wave to propagate away in direction 74. As the traveling wave moves, light from the traveling wave bend region 40 is scattered and made visible 30. In addition, as the traveling wave propagates, the intensity modulator 70 controls the quantity of light exiting the waveguide at the microbend region. Thus, the light intensity along a one-dimensional length of waveguide can be regulated.

Thin-Film Waveguide Display Systems

Figure 12:
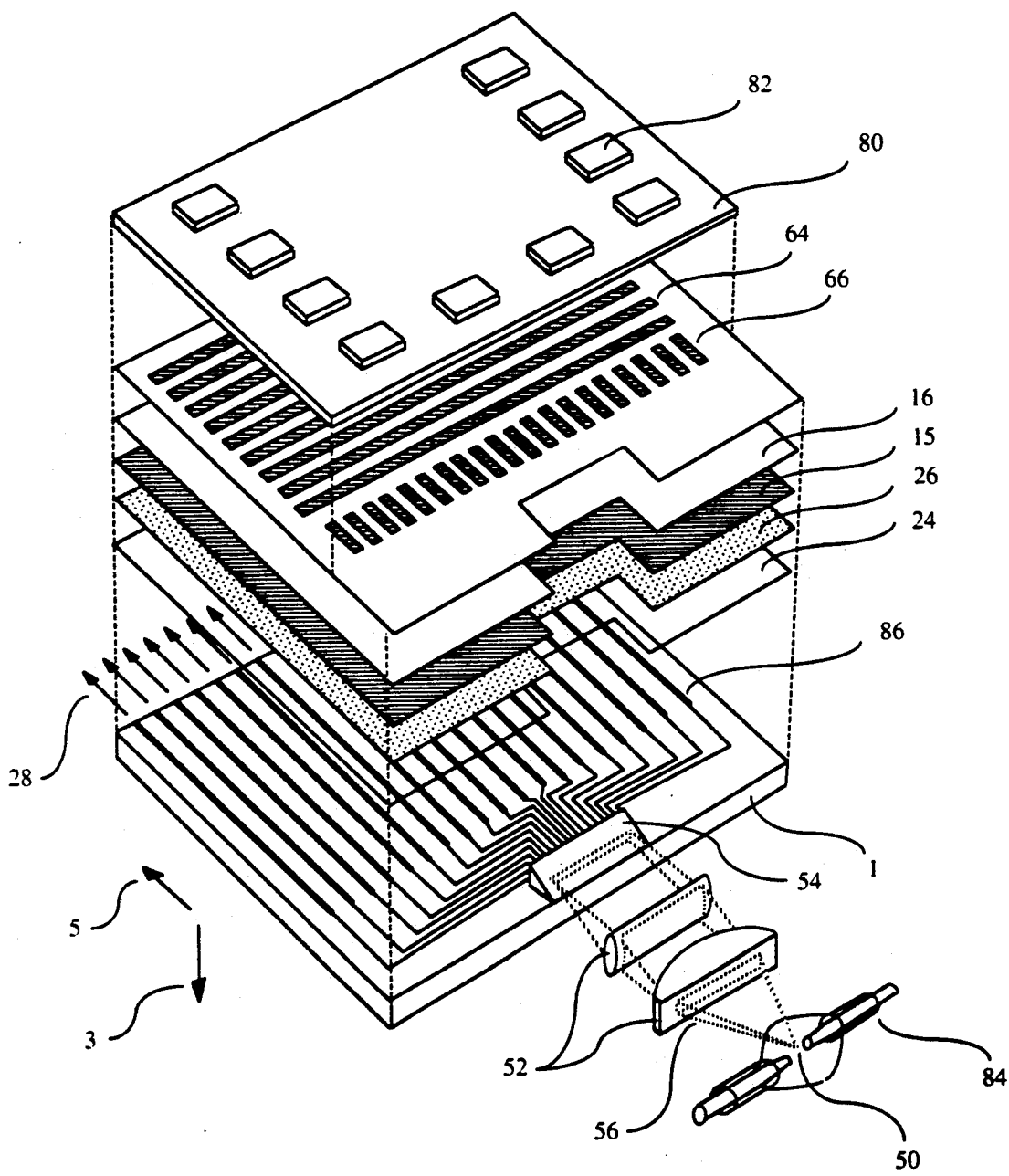
FIG. 12 is an exploded perspective view of a complete display comprising waveguides deposited on a substrate, acousto-optic intensity modulators and taps.
Figure 13:
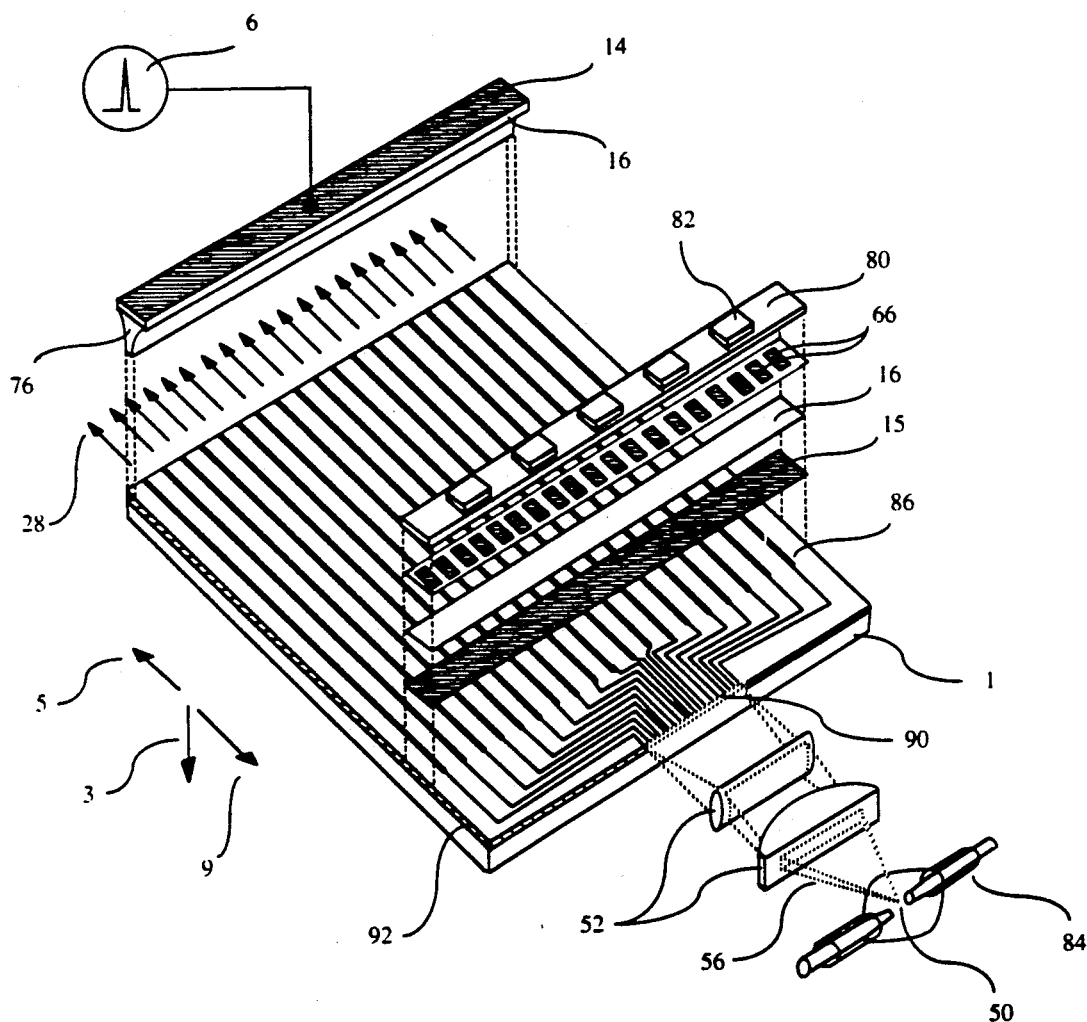
FIG. 13 is an exploded perspective view of a complete display using acoustic intensity modulators and a traveling acoustic wave.

FIGS. 12 and 13 show two methods for combining the previously described intensity modulator/tap waveguide segments into a complete display system. FIG. 12 shows an exploded perspective view of a display utilizing thin-film waveguides. In this system, light is guided by thin-film waveguides 86 deposited on a substrate 1.

The thin-film waveguide core 86 material can be deposited on the substrate using traditional sputtering, plasma polymerization, spinning and dipping techniques. Waveguide cores 86 can also be formed in the substrate itself using ion migration, proton bombardment and ion implantation. Either way, a high index region is applied to form the waveguide core elements.

Light is coupled into the waveguides from a point light source 50. Preferred light sources include xenon arc and quartz halogen lamps. Light from the source 56 is focused and shaped with lenses 52 into the waveguides using an evanescent field prism coupler 54. Once coupled into the waveguides from this prism, light travels in direction 5 until it exits the ends of the waveguides 28.

A top cladding layer 24 is placed over the waveguides. The top cladding layer 24 acts as an optical insulator to separate the core from the diffusing layer 26. A conductive bottom ground layer 15 is placed over the diffusing layer 26. A piezoelectric layer 16 is placed over the ground layer 15. On the top, the row electrodes 66 modulate the intensity of light in each of the waveguides. The tap electrodes 64 couple intensity modulated light out and make it visible.

The system is controlled by integrated circuits 82 placed on the two-sided printed circuit board 80. Conductors on the bottom side of the printed circuit board 80 feed through and contact the modulator 66 and tap electrodes 64. The electronics on the printed circuit board control the amount of light exiting the waveguide in direction 3 by controlling the intensity modulators. Proper regulation of the intensity modulators and taps allow still and moving images to be formed.

FIG. 13 shows a display based on a traveling acoustic wave-induced bending region. In this design, the traveling acoustic wave induces a bending region which propagates across the substrate. The bending caused by the traveling acoustic wave lets light out so it is visible. In FIG. 13, light from a point source 50 is used to feed the display. Light is focused 52 and end-coupled directly into the waveguide cores. The waveguides 86 are thin-film and integrated 92 with a light diffusing layer 15 onto a substrate 1. The precise layering of the optical thin-films, diffusing layer and piezoelectric layer is similar to the intensity modulator/tap segment shown in FIG. 11.

In operation, a traveling acoustic wave generated from the sound amplification horn 76 moves across the substrate 9. As the wave propagates, light exits 3 out to the viewer. The intensity of light in each of the waveguides is regulated by the intensity modulators 66. Acoustic energy generated by the piezoelectric layer 16 passes through the ground layer 15 into the waveguides 86 and controls the amount of light in each core. In this way, as the acoustically induced bend region scans across the substrate, the intensity of light in each of the waveguides is adjusted to create a complete image.

Waveguide Ribbon

Thin-film optical waveguides deposited on a substrate by sputtering, spinning and dipping techniques have a high light attenuation rate. The best transmittance achieved to date reduces light at a rate of 0.01 dB/cm. For example, a thin film waveguide 100 cm long will lose 1/5 of its light.

Another problem with thin-film waveguides is the expensive coupling techniques required to direct light from a light source into a collection of thin-film waveguides deposited on a substrate. Both the prism and end-alignment couplers require precision optical components. These precision components are expensive and their use adds considerably to the price of the total display. Consequently, without further improvements, thin-film technology is presently inadequate for use in large waveguide-based display systems.

To address these light attenuation and coupling problems, optical waveguides formed by fiber-optic drawing techniques can be employed instead. Fiber drawing methods have been extensively researched by the telecommunications industry. As a result of this work, high-quality, low-loss fibers are now routinely manufactured for use in optical communications systems.

Optical fiber is made by heating and softening bulk optical material in a furnace. The bulk material is then stretched out into thin strands of fiber. For example, silicon dioxide rods 1 inch in diameter can be stretched into a fiber 50 um in diameter with an attenuation less than 2 dB/Km.

Many single fibers can be placed across a substrate to create waveguide viewing screens. However, positioning single fibers across a substrate, side-by-side, is a laborious and expensive way to form a parallel system of waveguides. In an effort to make waveguides easier to arrange on the substrate, a ribbon 130 containing multiple cores is introduced in FIG. 14. This ribbon integrates many waveguides into a single unit to guide light across the display screen.

Figure 14:
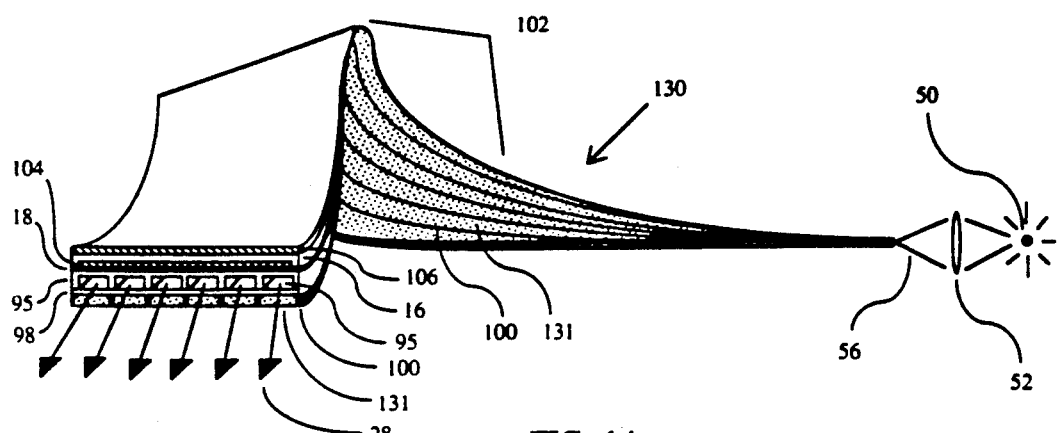
FIG. 14 is a perspective view of an optical waveguide ribbon made up of many individual waveguide elements.

In FIG. 14, light from a point source 50 is focused 52 into the ribbon cores 95. Once beyond in the cores 95, light propagates in parallel through each core element 95 until it exits the other end of the ribbon at 28. In the middle of the diagram the ribbon segment twists 102 and changes direction 90 degrees. In the twist region 102 the ribbon bends and folds over itself, re-orienting the direction of light contained in the waveguide cores to the viewer 28.

Waveguide ribbon has a number of advantages over thin film and individually drawn fiber. First its size and mechanical flexibility allow it to be conveniently placed over a wide variety of differently shaped substrates. Possible shapes include the curved and 360-degree wrap-around screens mentioned earlier in the application.

Second, since the essential intensity modulator/tap components can be integrated onto the ribbon, the substrate may be made of virtually any clear material. In contrast to thin-film waveguides, which require expensive defect-free substrates, ribbon may be placed on a wide variety of different low-cost substrates. Reducing the cost of the substrate is very important as the size of the screen increases. In very large, wall-sized displays, the substrate makes up a significant fraction of the total display price. By economizing on the types of substrate that can be used, the cost of the entire panel can be lowered.

The third advantage to using waveguide ribbon is the possibility of automating the manufacturing process. Optical ribbon can integrate waveguides, modulators and taps into a long, continuous, single-piece unit. Since these elements are at the heart of the display, producing the ribbon is a major portion of the display manufacturing process. In fact, once the ribbon has been fabricated, it is only necessary to lay ribbon segments on a substrate, next to each other, to form a viewing screen. The process of placing ribbon segments together is not unlike arranging wall paper to cover a wall. Each ribbon segment is aligned next to other ribbons to cover the complete viewing screen.

Producing waveguide ribbon with traditional furnace/drawing techniques allows the ribbon manufacturing process to be automated. In practice, a block of bulk optical material containing parallel cores is placed in a furnace where it is heated, softened and stretched out. Stretching the softened optical material causes it to become thin and elongated. The dimensions of the resulting ribbon should be in the range of 50–500 um thick and 10–100 mm wide. Ribbon with these dimensions will be flexible, so it can be wrapped and twisted as shown in FIG. 14. Flexible waveguide ribbon can be rolled onto spools for storage before applying the metal and piezoelectric layers.

Machines capable of depositing metal and piezoelectric materials onto optical ribbon area straightforward to built. Long lengths of waveguide ribbon rolled onto spools and placed in such machines will automatically be deposited with metal and piezoelectric layers, then etched to create tap and intensity modulator electrodes. Processing ribbons by rolling them onto spools is considered to be an important manufacturing technique introduced by this invention.

The fourth advantage to using ribbon is in controlling the angel of light entering the ribbon cores. Controlling the propagation mode of light in a waveguide core is essential to realizing the optimal efficiency of the display modulators and taps. Light in a high order mode is typically weakly guiding and therefore easier to make exit the waveguide at an intensity modulator or tap. Since the spacing of the cores in optical ribbon can be made very regular, the launch angle of light entering the ribbon cores may be precisely controlled. The preferred light coupling method will be shown in the next section.

Figure 15:
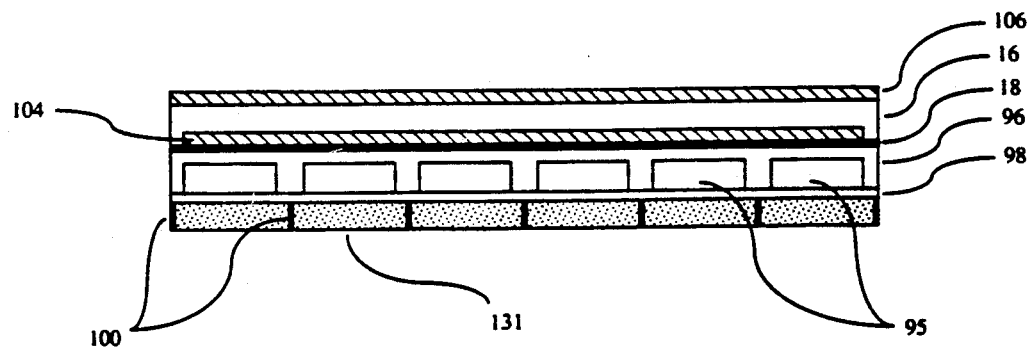
FIG. 15 is an enlarged cross section view of the waveguide ribbon shown in FIG. 14.

FIG. 15 shows an enlarged cross-section slice of a waveguide ribbon. The ribbon is composed of a plurality of cores 95 surrounded by low-index cladding material 96, 98. Acoustic energy from the piezoelectric layer 16 propagates through the bottom ground conductor 104 and into the core and cladding layers. The top electrode 106 connects to an electric signal source which controls the intensity of the generated acoustic energy.

A light diffusing layer 131 is placed in contact with the bottom cladding layer 98 to scatter light from the cores in many different directions. Imbedded in the diffusing layer are light blocks 100. The light blocks act to separate light coupled from each individual waveguide element in the ribbon.

The opaque layer 18 absorbs ambient and scattered light which is directed backward into the ribbon. The opaque layer 18 increases the contrast ratio of the display by making the screen appear darker when light is not tapped out of the waveguides. A dark background also enables the screen pixels to show a greater range of different shades. The absorption layer 18 can be made of materials such as black glass, plastics, or a pigment applied directly to the top cladding layer.

Figure 16:
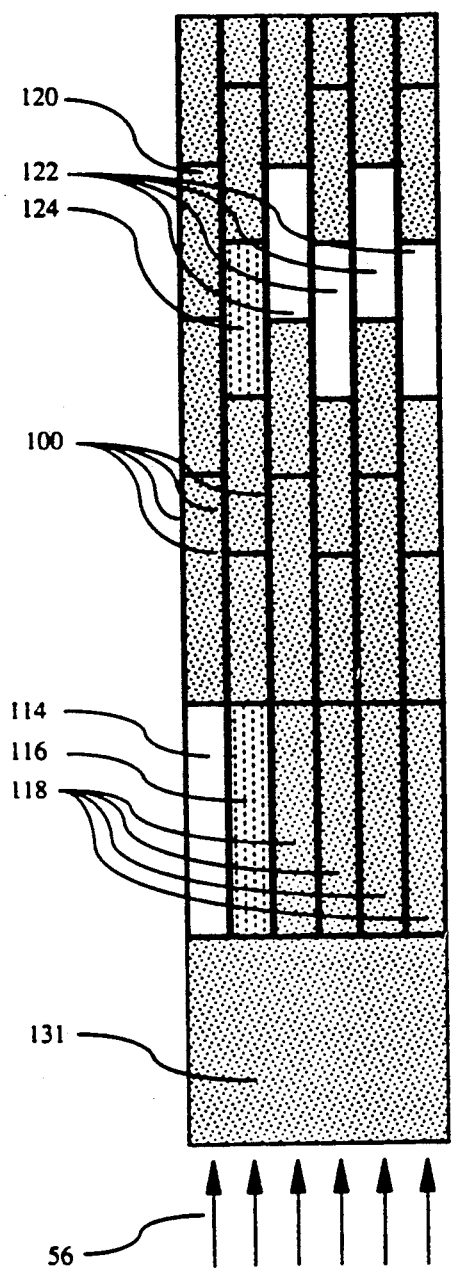
FIG. 16 is a front view of the light emitting side of the waveguide ribbon shown in FIG. 14.
Figure 17:
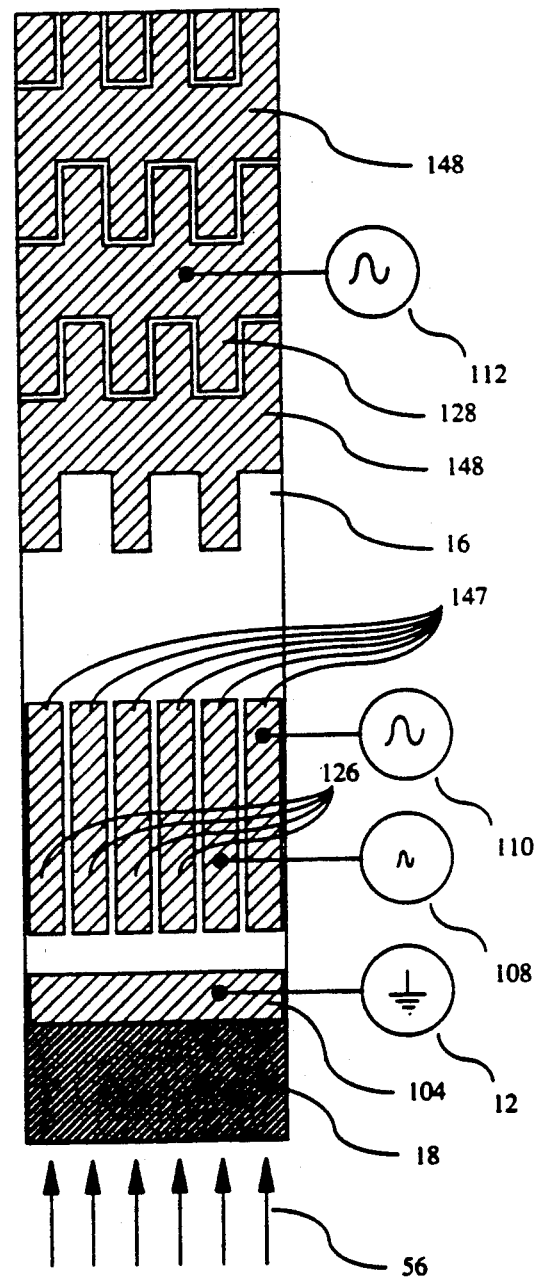
FIG. 17 is a back view of the waveguide ribbon shown in FIG. 16.

FIGS 16 and 17 show front and back views of the waveguide ribbon. The front view in FIG. 16 is the light emitting side of the ribbon. Light scattered from the diffusing layer 131 on this side makes its way to the viewer. FIG. 17 is the back of the corresponding piece of ribbon. The back shows the control electrodes which modulate the intensity and tap light out at different positions along the length of the waveguide.

Light 56 enters the waveguide cores at the bottom of the diagram. The ribbons in FIGS. 16 and 17 each have six waveguide cores spaced in parallel next to each other. Optical insulators 100 embedded in the diffusing layer, increase the definition of the pixels. The light intensity in the waveguide cores is first controlled by the intensity modulators 147. The intensity modulators regulate the brightness of light in the waveguides before it is tapped out and displayed. Light modulated out of the intensity modulators exits the ribbons in regions 114, 116 and 118.

The remaining light travels through each of the ribbon cores until it exists at the taps controlled by electrodes 128 and 148. Taps direct all of the remaining light in the waveguides out to the viewer. Depending on which tap is active, light from electrodes 128 and 148 will leave the waveguide and be viewed at different locations. For example, if tap 128 is active, light will exit the ribbon in regions 120, 122 and 124.

The amount of light observed at an active tap is determined by the intensity modulators 147 associated with the waveguide supplying light to that tap. For example, intensity modulators 126 are not active. As a result, not light is emitted from the visible side of the waveguide 118. However, since not light has been made to escape intensity modulator 126, bound light continues through the waveguides and exits at the tap location 122. IN other words, when the modulator segments 118 are dark, the corresponding tap areas 122 are bright.

Light made to exit the waveguide at the intensity modulator region 147 reduces the quantity of light available which can exit the tap. For example, signal source 110 provides a large signal to one tap. The light emitted from this intensity modulator is intense 114. As consequence, there is little light left in he core to exit the waveguide at its corresponding tap point 120. Intermediate amounts of light can also be displayed as shown by modulator 116 and tap 124. Applying a medium-sized modulation signal 108 to the intensity modulator reduces the amount of light which can be viewed at the tap location 124 controlled by signal 112.

Coupling Light into Many Separate Ribbons

Multiple ribbon segments must be placed next to each other, side by side, to cover a screen area wider than one ribbon. Directing light from a source into the cores of many separate ribbons, placed next to each other, is normally difficult to accomplish. The end and prism coupling techniques previously shown may be used. However, as noted, these methods are expensive; requiring the careful alignment of precision optical components.

An alternative approach to coupling light into ribbons is to stack them on top of each other. Light is more easily launched into ribbons stacked on top of one another. Stacking ribbons is preferred to traditional end and prism coupling because it reduces the size of the light source 50 and focusing optics 52.

Figure 18:
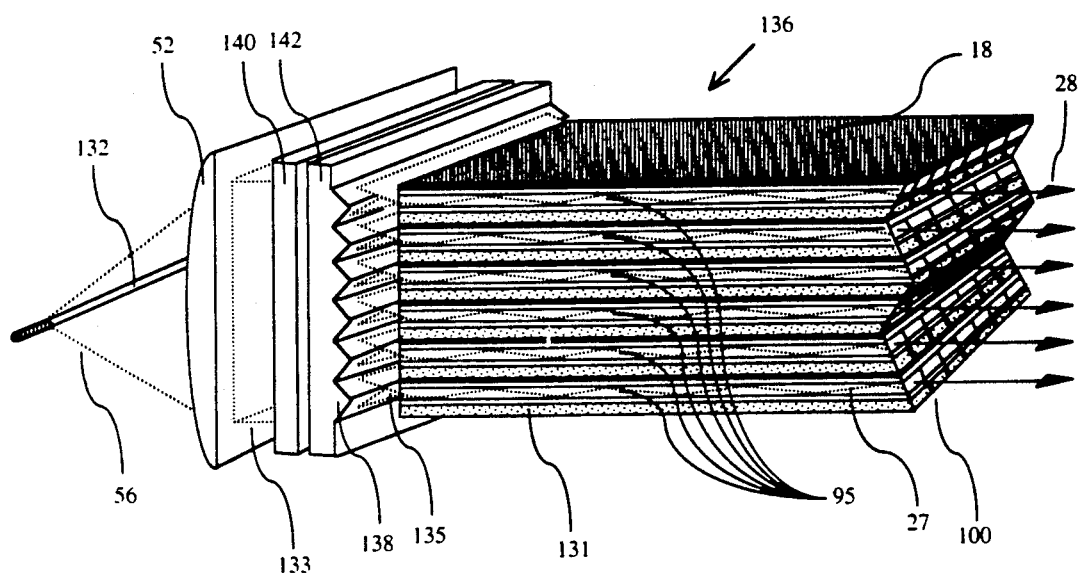
FIG. 18 is a perspective view of a method to precisely couple light into a stack of waveguide ribbons.

FIG. 18 details how light is directed into a stack of waveguide ribbons. Light 56 from a continuous strip source 132 is tightly focused 52 into a collimated beam 133. Light sources which may be used include quartz-halogen and xenon-arc lamps. Light from halogen and xenon sources is typically "white" and contains a broad-spectrum of high and low wavelength light. Other potential light sources may employ pulsed and/or coherent light.

In the preferred embodiment, broad-spectrum white light must be filtered 140 before it enters the ribbon cores. Filtering removes potentially damaging infra-red and ultraviolet components in the white light. Light leaving the filter then passes through a focusing lens 142 before it is directed into the ribbon cores 95.

The focusing lens 142 contains a series of small focusing elements shown here as ridges 138. Each focusing element 138 serves to direct light into the ribbon waveguide cores. The angle of the light exiting the focusing elements 138 determines the mode of the light propagating through the waveguide. If the angle is great, light will propagate through the core in a high order mode. Light in a high mode is more easily coupled out via acousto-optic and electro-optic taps. The focusing elements 138 provide a precise means for determining the mode of light traveling through the ribbon cores 95.

The small focusing elements 138 also keeps the parallel beam of light 133 from hitting the ends of the cladding 18 and diffusing layers 131 where light will be absorbed. Focusing light directly into the cores keeps it from being wasted by hitting the diffusing and cladding layers. Eliminating light coupling inefficiencies is using small focusing lens elements 138 allows smaller, less-power consuming illumination sources to be used in the display.

A Ribbon-Based Display System

Figure 19:
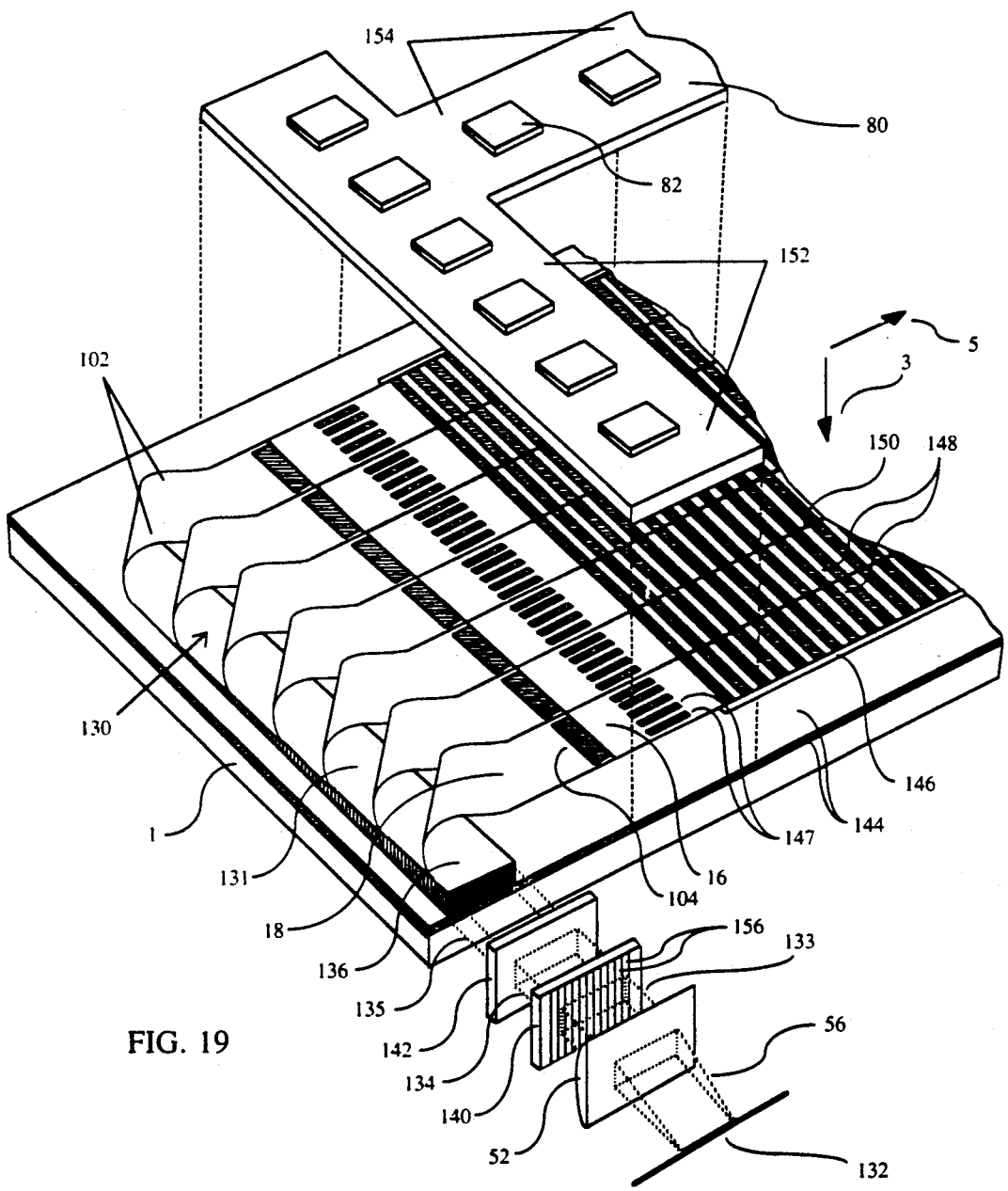
FIG. 19 is an exploded perspective view of a complete display made up of waveguide ribbons.

FIG. 19 shows a perspective view of a screen made up of many individual ribbon segments. Light is coupled into the ends of ribbons which are initially stacked on top of one another. Individual ribbons in the stack are then systematically folded over, fanned-out and arranged to cover the substrate 1. Ribbons, placed side-by-side on the substrate, cover the entire viewing screen.

Typically, the substrate 1 is made of a clear material such as glass or plastic. Between the substrate and the ribbons is an opaque layer 144. The opaque layer keeps stray light emanating behind the panel from making its way to the viewer. In particular, the opaque layer 144 hides the folded ribbons 102 and intensity modulators 147. Thus, a viewer can not see the light source, modulators or folded ribbon elements that are required to make the display function properly.

In the center of the opaque layer 144 is a transparent region 146. The transparent region enables light tapped out from the ribbon cores to make its way to the viewer. Images and pictures formed by tapping light out of ribbon cores travel in direction 3 through the transparent region 146.

Ribbons are fixed to the substrate using an adhesive. A preferred adhesive is an light curable plastic. The plastic is applied as a thin liquid over the substrate. Ribbons are then positioned and aligned next to each other on the substrate while the plastic is in a liquid form. The plastic, while in a liquid form, causes minimal friction between the ribbon and the substrate. Low friction allows ribbons to be easily positioned and precisely aligned. When the ribbons are in the proper place, light is applied to the plastic, causing it to harden and fixing the ribbons to the substrate.

Initially, light 56 from a strip light source 132 is focused into a collimated beam 133. This collimated beam is then passed through a filter 140. The filter removes damaging ultraviolet and infrared light components. In addition, the filter can contain red, green and blue (RGB) stripes 156 running vertically down its length. These RGB strips allow only one color of light to enter into each of the waveguide cores contained in the ribbons. In other words, by using filters, a particular ribbon core 95 can be made to only carry one of the three primary light colors. The specific color carried by a ribbon core is chosen so RGB patterns alternate across the ribbon. Coloring light prior to its entry into the ribbon cores allows the entire panel to display color images.

Colored light 134 from the filter 140 is passed through a focusing lens 142 and directed into the ribbon waveguide cores. The focusing lens contains numerous lens elements 138. (not shown) These lens elements efficiently couple light into the ribbon cores 130, without allowing it to hit the cladding 20, 24 and diffusing 131 layers. Once in the cores, guided light travels through the bend region 102, in each ribbon, where it is redirected in direction 5.

The amplitude of the light contained in the ribbon cores is first modulated by the intensity modulators 147. Intensity modulators regulate the brightness of light contained in each ribbon core 130 independently. Intensity modulated light continues in direction 5 until it is made visible at one of the taps 148. Taps direct brightness controlled light out of the core and to the viewer in direction 3.

The taps shown in FIG. 19 look different than the taps shown in FIG. 17. The taps 148 shown in FIG. 17 form a staggered pixel pattern. Staggered pixels are commonly used in commercial color CRTs. In FIG. 19 the taps are straight, running perpendicular to the direction 5 of the optical waveguides. Either straight or staggered taps may be used.

The taps placed on each of the ribbons run as close to the edge of the ribbons 150 as possible. However, because the ribbons are formed separately, a tap on one ribbon will typically not conduct across to a tap placed on a ribbon next to it. Connecting taps on adjacent ribbons, so they conduct, eases the task of connecting the drive electronics. When taps conduct across a number of ribbons, a single tap connection made to one ribbon will control all of the corresponding taps on the rest of the ribbons across the display. Controlling a number of taps with a single connection, greatly reduces the number of needed drive wires.

Many methods can be used to connect taps formed on separate ribbons. These include solder re-flow, wave soldering, chemical vapor deposition, ultrasonic wire-bonding and using special tape will conductive regions running perpendicular to its length. Regardless of the means employed, the tap metallization between ribbons is made to conduct in the preferred embodiment of the invention.

The printed circuit board 80 contains integrated circuits 82 to drive the intensity modulators and taps on the display. Conductors feed-through the bottom of the printed circuit board and make contact with intensity modulator and tap conductors placed on the ribbons. The printed circuit board controls the intensity modulators and taps so still and moving images can be formed.

The printed circuit board 80 is shaped like a "T". One segment 152 of the printed circuit board is placed over the intensity modulators. This segment controls the brightness of light in each of the waveguides 95. It also contacts the ground conductors 104 which run in direction 5 under the entire length of the piezoelectric layer 16. The other segment 154 of the printed circuit board controls the taps 148. This segment directs intensity modulated light in the ribbon cores 95 to the viewer.

RAMIFICATIONS AND CONCLUSIONS

While this application contains many specifics, the reader should not construe these as limitations on the scope of the invention. Rather, they are merely exemplifications of the preferred embodiments. Those skilled in the art will envision many other possible variations that are apparent given the ideas presented here.

For example, a wide variety of different waveguide taps could be used in place of the preferred acousto-optic taps. In particular, electro-optic taps like those shown in FIGS. 8 and 9 could readily be substituted. Electro-optic taps are easily substituted because they share many of the same high-speed switching, low-power consumption and solid-state construction characteristics which make acoustic taps attractive.

A different type of acoustic tap which uses surface acoustic waves could also be used. Surface acoustic waves propagate within several acoustic wavelengths of the top of a substrate. Consequently, surface acoustic waves concentrate a great deal of sound energy into a small region located near the surface for a material. Thus, surface waves could be particularly useful when tapping light traveling through thin-film optical waveguides.

Another tap approach might employ liquid crystals as a waveguide cladding layer. In practice, one side of the waveguide cladding could be formed by applying a thin layer of liquid crystals. It is well known that liquid crystals change their index of refraction in the presence of an electric field. Electrodes placed on either side of the core, and the liquid crystal cladding layer, could be used to control the light emitted from the waveguide core.

Electric signals applied to the electrodes will alter the orientation, and thus the index of refraction, of the liquid crystals in the cladding layer. These changes in the index of refraction will allow light to exit the core and travel to the viewer.

The diffusing layer could also be formed separately on the substrate. This is in contrast to integrating the diffusing layer directly onto the ribbon or fibers. Placing the diffusing layer on the substrate helps conceal slight visual imperfections caused when arranging separate ribbons or fibers next to each other.

Similarly, color filters could also be deposited directly on the substrate, ribbons or fibers. Instead of coloring light prior to its entry in each of the waveguides, all waveguides could be made to carry white light. White light tapped out of the cores could then be colored by passing it through color filters on its way to a viewer.

There are virtually an unlimited number of ways to control intensity modulators and taps to generate images in waveguide-based displays. Thus, the specific drive methodologies have intentionally not been specified.

Lastly, the substrate itself might also be made extremely thin and flexible. A thin, flexible, substrate will allow the screen to rolled up. This enables the display to be stored in a small space when it is not being used. It might also be necessary to place a conductive envelope around the entire substrate to protect the environment from the emission of radio frequency electromagnetic signals caused by driving the intensity modulators and taps.

Accordingly, the reader should determine the scope of the invention by the appended claims and their legal equivalents, and not by the examples which have been given.

What is claimed is:

1. A display system comprising:
a plurality of optical waveguides,
a light source positioned in a light coupling relationship to said plurality of optical waveguides,
and an acoustic light exiting means for causing a portion of light traveling through said plurality of optical waveguides to exit selectively so light can be viewed at selected locations oriented along the lengths of the waveguides in said plurality of waveguides.

2. The display system as claimed in claim 1 in which said acoustic light exiting means is one of optically diffractive, refractive and evanescent devices.

3. The display system as claimed in claim 1 in which said plurality of optical waveguides have a ribbon-like form.

4. The display system as claimed in claim 1 in which said acoustic light exiting means is a device which propagates an acoustic ave along the orientation of light flow through said plurality of optical waveguides.

5. The display system as claimed in claim 1 in which said acoustic light exiting means is a device which propagates acoustic energy perpendicular to the direction of light flow through said plurality of optical waveguides.

6. The display system as claimed in claim 1 in which aid acoustic light exiting means comprises a piezoelectric material.

7. The display system as claimed in claim 1 in which light from said plurality of waveguides is redirected by an optical material placed in close proximity to the waveguides in said plurality of optical waveguides.

8. A display system comprising:
a plurality of optical waveguides,
a light source positioned in a light coupling relationship to said plurality of optical waveguides,
and a controllable light exiting means for causing a portion of light traveling through said plurality of optical waveguides to exit selectively so light can be viewed at selected locations oriented along the lengths of the waveguides in said plurality of waveguides.
said plurality of optical waveguides having a ribbon-like structure wherein a plurality of said ribbon-like structures are stacked on top of each other.

9. A display system as claimed in claim 8 in which said plurality of ribbon-like optical waveguide structures are also positioned in a side-by-side relationship.

10. The display system as claimed in claim 8 in which light from said light source is precisely directed into the waveguide cores in said ribbon-like structure by a light directing means.

11. A display system as claimed in claim 10 in which said light directing means comprises a plurality of lenses.

12. A display system as claimed in claim 11 in which said plurality of lenses are formed in a continuous optical material.

13. A display system comprising:
a plurality of optical waveguides,
a light source positioned in a light coupling relationship to said plurality of optical waveguides,
and a controllable light exiting means for causing a portion of light traveling through said plurality of optical waveguides to exit selectively so light can be viewed at selected locations oriented along the lengths of the waveguides in said plurality of waveguides.
and a visible light absorbing material layer placed in proximity to said plurality of optical waveguides in order to darken and improve the appearance of images formed by said plurality of optical waveguides and said controllable light exiting means.

14. The display system as claimed in claim 13 in which said controllable light exiting means is one of electro-optic, acousto-optic, thermo-optic and magneto-optic devices.

15. The display system as claimed in claim 13 in which said controllable light exiting means is one of optically diffractive, refractive and evanescent field coupling devices.

16. The display system as claimed in claim 13 in which said plurality of optical waveguides are placed between an observer and said visible light absorbing material.

17. The display system as claimed in claim 13 in which said visible light absorbing material is placed between the individual waveguides in said plurality of optical waveguides.

18. The display system as claimed in claim 13 in which said visible light absorbing material is placed between said plurality of optical waveguides and an observer.

19. The display system as claimed in claim 18 in which said visible light absorbing material completely absorbs all of the light from said controllable light exiting means.

20. The display system as claimed in claim 18 in which said visible light absorbing material serves to keep light in a well defined region located near said optical waveguides.

21. A display system comprising:

a plurality of optical waveguides, a light source positioned in a light coupling relationship to said plurality of optical waveguides, and a controllable light exiting means for causing a portion of light traveling through said plurality of optical waveguides to exit selectively so light can be viewed at selected locations oriented along the lengths of the waveguides in said plurality of waveguides.

and filter means positioned in a light coupling relationship to one or both of said broad-spectrum light source and said plurality of optical waveguides.

22. The display system as claimed in claim 21 in which said filter means is positioned between said light source and said plurality of optical waveguides so that light from said light source is colored before it enters the ends of said plurality of optical waveguides.

23. The display system as claimed in claim 21 in which said filter means is positioned between an observer and said optical waveguides so that light from said light source is colored after it exits said plurality of optical waveguides from said controllable light exiting means.

* * * * *